(12) United States Patent
Zhang et al.

(10) Patent No.: US 10,692,089 B2
(45) Date of Patent: Jun. 23, 2020

(54) USER CLASSIFICATION USING A DEEP FOREST NETWORK

(71) Applicant: Alibaba Group Holding Limited, George Town (KY)

(72) Inventors: Yalin Zhang, Hangzhou (CN); Wenhao Zheng, Hangzhou (CN); Longfei Li, Hanzghou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/366,841

(22) Filed: Mar. 27, 2019

(65) Prior Publication Data

US 2019/0303943 A1    Oct. 3, 2019

(30) Foreign Application Priority Data

Mar. 27, 2018    (CN) .......................... 2018 1 0258227

(51) Int. Cl.
*G06Q 20/40*   (2012.01)
*G06N 3/04*    (2006.01)
(Continued)

(52) U.S. Cl.
CPC ....... *G06Q 20/4016* (2013.01); *G06F 16/906* (2019.01); *G06K 9/6256* (2013.01);
(Continued)

(58) Field of Classification Search
CPC ...... G06Q 20/4016; G06N 3/08; G06N 20/00; G06N 20/20
See application file for complete search history.

(56) References Cited

U.S. PATENT DOCUMENTS 7,853,469 B2 * 12/2010 Maitland ............ G06Q 10/0631
                                                    705/7.12
7,853,533 B2 * 12/2010 Eisen ................. G06Q 20/3674
                                                    368/89
(Continued)

FOREIGN PATENT DOCUMENTS

CN    107240087    10/2017
CN    107506796    12/2017

OTHER PUBLICATIONS

Zhou, Z-H., et al., "Deep Forest: Towards an Alternative to Deep Neural Networks", 2017,Accessed from ArXiv.org on Jun. 7, 2019, https://arxiv.org/abs/1702.08835v1 (Year: 2017).*
(Continued)

*Primary Examiner* — Luis A Sitiriche
*Assistant Examiner* — Nader Metwalli
(74) *Attorney, Agent, or Firm* — Fish & Richardson P.C.

(57) ABSTRACT

The present disclosure describes techniques for object classification using deep forest networks. One example method includes classifying a user object including features associated with the user based on a deep forest network including identifying one or more user static features, one or more user dynamic features, and one or more user association features from the features included in the user object; providing the user static features to first layers, the user dynamic features to second layers, and the user association features to third layers, the first, second, and third layers being different and each providing classification data to the next layer based at least in part on the input data and the provided user features.

20 Claims, 9 Drawing Sheets

(51) Int. Cl.
*G06K 9/62* (2006.01)
*G06F 16/906* (2019.01)
*G06N 20/20* (2019.01)

(52) U.S. Cl.
CPC ......... *G06K 9/6267* (2013.01); *G06N 3/0472* (2013.01); *G06N 20/20* (2019.01)

(56) References Cited

U.S. PATENT DOCUMENTS

2016/0104163 A1* 4/2016 Aquino .................. G06Q 40/12
705/44
2018/0060728 A1 3/2018 Shan et al.

OTHER PUBLICATIONS

Ho, T.K., "The Random Subspace Method for Constructing Decision Forests", 1998, IEEE Transactions on Pattern Analysis and Machine Intelligence, vol. 20, No. 8, Aug. 1998 (Year: 1998).*

Utkin et al., "A Siamese Deep Forest," Department of Telematics, Peter the Great St. Petersburg Polytechnic University, St. Petersburg, Russia, Apr. 27, 2017,18 pages.
Utkin et al., "An Adaptive Weighted Deep Forest Classifier"; Peter the Great St. Petersburg Polytechnic University, Jan. 4, 2019, 19 pages.
Zhou et al., "Deep Forest," National Key Laboratory for Novel Software Technology, Nanjing University, Nanjing, China, May 14, 2018, 34 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Search Report and Written Opinion in International Application No. PCT/US2019/024334, dated May 28, 2019, 11 pages.
Utkin et al., "Discriminative Metric Learning with Deep Forest," Cornell University Library, 201 Olin Library Cornell Univesity, Ithaca NY, 2017, XP080950313, 16 pages.

* cited by examiner

USER CLASSIFICATION USING A DEEP FOREST NETWORK

CROSS-REFERENCE TO RELATED APPLICATIONS

This application claims priority to Chinese Patent Application No. 201810258227.4, filed on Mar. 27, 2018, which is hereby incorporated by reference in its entirety.

TECHNICAL FIELD

Implementations of the present specification relate to the field of Internet technologies, and in particular, to an object classification method, an apparatus, a server, and a storage medium.

BACKGROUND

With the popularity of the mobile Internet, online payment has become a lifestyle for people. During online payment transactions, abnormal users or transactions often try to obtain the profits of online payment transactions through illegal means (for example, to cash out bonus money from online financial services). Finding and discovering the abnormal users or abnormal transactions can help to effectively find and prevent such abnormal behavior.

SUMMARY

Implementations of the present specification provide an object classification method, an apparatus, a server, and a storage medium.

An implementation of the present specification provides an object classification method, including: performing feature extraction on data of an object to be identified to obtain a user's initial feature, and segmenting the object's initial feature to obtain a plurality of types of object sub-features; sequentially circulating or randomly inputting the various types of object sub-features to each level of decision tree forest set in a pre-trained deep forest network; and performing decision classification on the object to be identified based on the deep forest network.

An implementation of the present specification further provides an object classification apparatus, including: a feature extraction and processing unit, configured to perform feature extraction on data of an object to be identified to obtain a user's initial feature, and segment the object's initial feature to obtain a plurality of types of object sub-features; and a prediction unit, configured to sequentially circulate or randomly input the various types of object sub-features to each level of decision tree forest set in a pre-trained deep forest network, and perform decision classification on the object to be identified based on the deep forest network.

An implementation of the present specification further provides a server, including a memory, a processor, and a computer program that is stored on the memory and that can run on the processor, where the processor performs steps of the method according to any one of the previous implementations when executing the program.

An implementation of the present specification also provides a computer readable storage medium, where a computer program is stored on the computer readable storage medium, and a processor performs steps of the method according to any one of the previous implementations when the program is executed by the processor.

The implementations of the present specification have the following beneficial effects:

In the object classification method provided in the implementations of the present invention, features of object data can be segmented, and for each type of object sub-feature obtained after the segmentation, decision classification can be performed by using a plurality of base classifiers in each level of decision tree forest set in a deep forest network, to eventually determine a probability that an object is abnormal. In addition, when samples of the abnormal object are likely to be sparse, a k-fold cross-validation method can be used to train a base classifier, thereby alleviating the overfitting problem.

DESCRIPTION OF IMPLEMENTATIONS

To better understand the technical solutions, the following describes in detail the technical solutions in the implementations of the present specification by using the accompanying drawings and the implementations. It should be understood that the implementations of the present specification and features in the implementations are detailed descriptions of the technical solutions in the implementations of the present specification, and are not intended to limit the technical solutions of the present specification. In the case that no conflict exists, the implementations of the present specification and the technical features in the implementations can be mutually combined.

Figure 1:
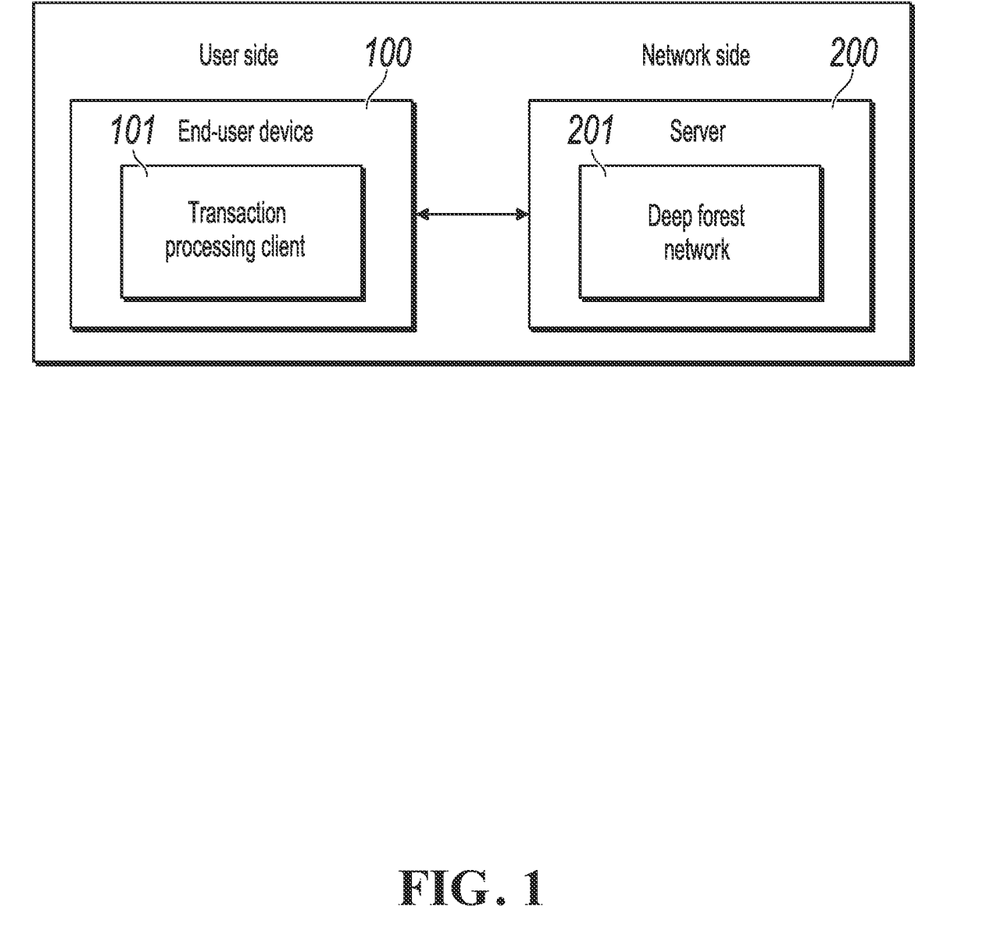
FIG. 1 is a schematic diagram illustrating an object classification scenario, according to an implementation of the present specification.

Referring to FIG. 1, FIG. 1 is a schematic diagram illustrating an object classification scenario, according to an implementation of the present specification. An end-user device 100 is located on a user side, and communicates with a server 200 on a network side. An object processing client 101 in the end-user device 100 can be an APP or a website that implements a user's business based on the Internet, and provides a transaction interface for a user, and provides object data (user related data or transaction related data) for the network side for processing. The server 200 uses a pre-trained deep forest network 201 to classify an object involved in the transaction processing client 101.

In the present implementation of the present invention, the object includes but is not limited to two objects: a user and a business.

If the object is a user, when classifying the user, the present implementation can be used to identify whether the user is an abnormal user or a normal user. User data is data related to a user attribute or behavior, for example, includes but is not limited to user's basic information (such as gender, age, etc.), user's dynamic information (such as description information of recent N transactions), and user's associated information (namely, other user information related to the user, for example, information about other users who have traded with the user recently). Feature extraction is performed on the user data to obtain various types of user sub-features. The user sub-feature includes but is not limited to a user's static feature (extracted from the user's basic information), a user's dynamic feature (extracted from the user's dynamic information), and a user's associated feature (extracted from the user's associated information).

When the object is a business, the business can be further an online transaction, or can be a network service such as a search engine, an online resource, or an advertisement recommendation. The online transaction is used as an example. When classifying online transactions, the present implementation can be used to identify whether a transaction is an abnormal transaction or a normal transaction. Business data is historical data and real-time data related to a business, for example, business data includes but is not limited to related data such as a business turnover, a business quota, and a business frequency. Feature extraction is performed on the business data to obtain various types of business sub-features. The business sub-feature includes but is not limited to a historical business feature and a real-time business feature.

The previous description is merely an example of two cases in which the object includes a user or a business, and shall not be construed as a limitation.

The following uses a user object as an example to describe the implementations of the present invention.

With the development of artificial intelligence, machine learning, as the most important technology in artificial intelligence, has gained more and more attention. Machine learning algorithms are more flexible and intelligent. Nowadays, a gradient boosted decision tree is used in most of machine learning solutions based on a plurality of types of features (discretion features, continuation features, and classification attribute features). Although this structure can apply to a plurality of scenarios, there are some limitations. For example, when there are relatively few black samples, there are still disadvantages in terms of how to find more black users and how to improve the prediction accuracy.

In a risk control scenario, a user with a security risk usually needs to be found, and such users are relatively few compared with normal users. Therefore, an implementation of the present invention provides an object classification method for abnormal-user identification, and the method is applied to the intelligent risk control field. As such, more abnormal users can be found by using methods such as user feature segmentation and cross-validation than by using algorithms in the existing technology.

Figure 2:
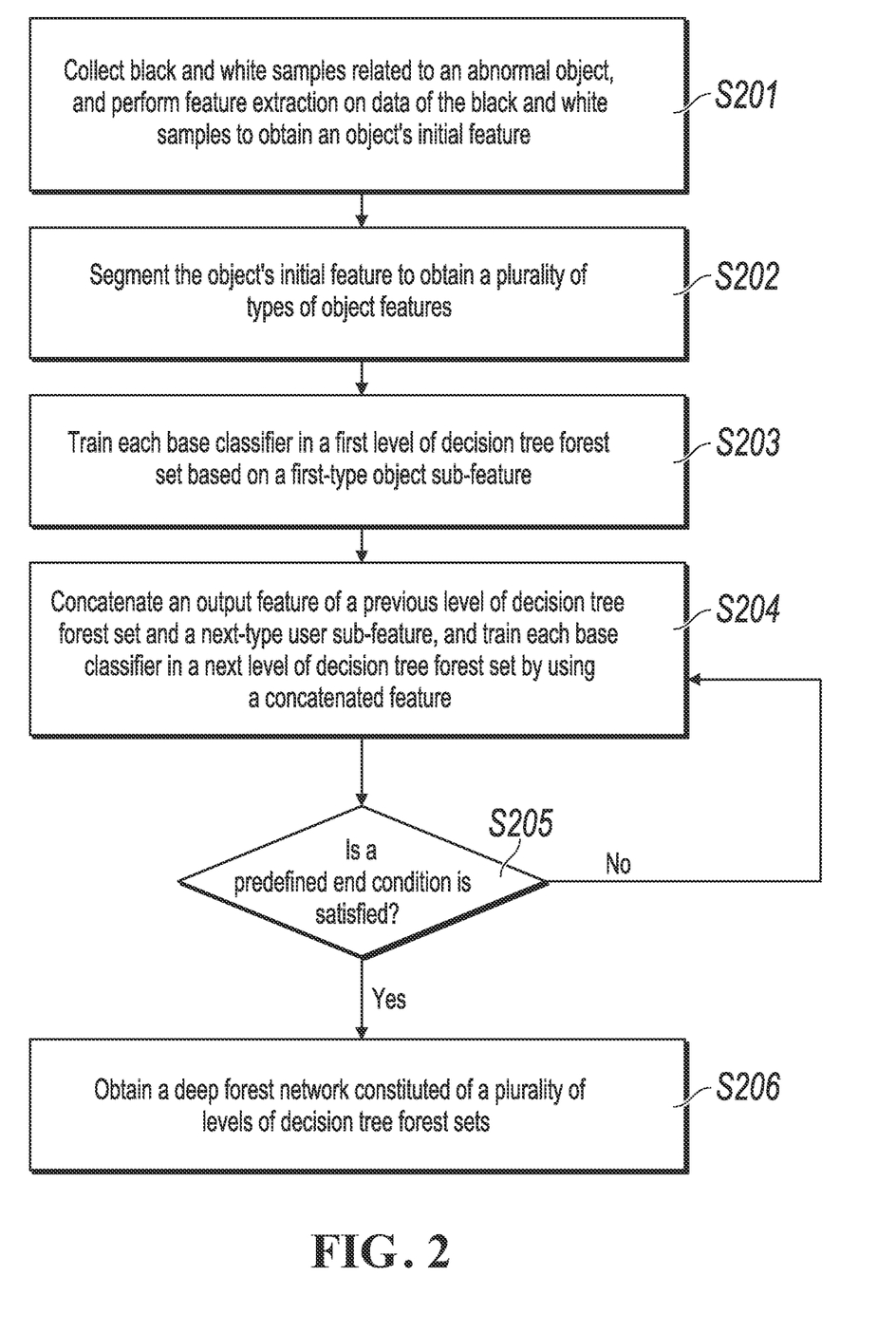
FIG. 2 is a flowchart illustrating a method for training a deep forest network for object classification, according to an implementation of the present specification.

An implementation of the present specification provides a flowchart illustrating a method for training a deep forest network for object classification. Referring to FIG. 2, the method includes steps S201 to S206.

S201. Collect black and white samples related to an abnormal object, and perform feature extraction on data of the black and white samples to obtain an object's initial feature.

A user object is used as an example. Black and white samples of a user are separately collected from historical transaction data. A black sample is a sample of an abnormal user, and a white sample is a sample of a normal user. In practice, because abnormal users are in the minority compared with normal users, a problem of low trained network accuracy due to insufficient black samples sometimes may happen.

After the black and white samples are obtained, feature extraction is performed on the black and white samples to obtain a user's initial feature. As each user has a large number of feature descriptions, the user's initial feature is too large. If the user's initial feature is input to a deep forest network directly, the number of features is too large, the training (and prediction) is inefficient, and the enhancement effect is not satisfying. Therefore, in the present implementation of the present invention, user's initial feature information is segmented in step S202.

S202. Segment the object's initial feature to obtain a plurality of types of object sub-features.

Figure 3:
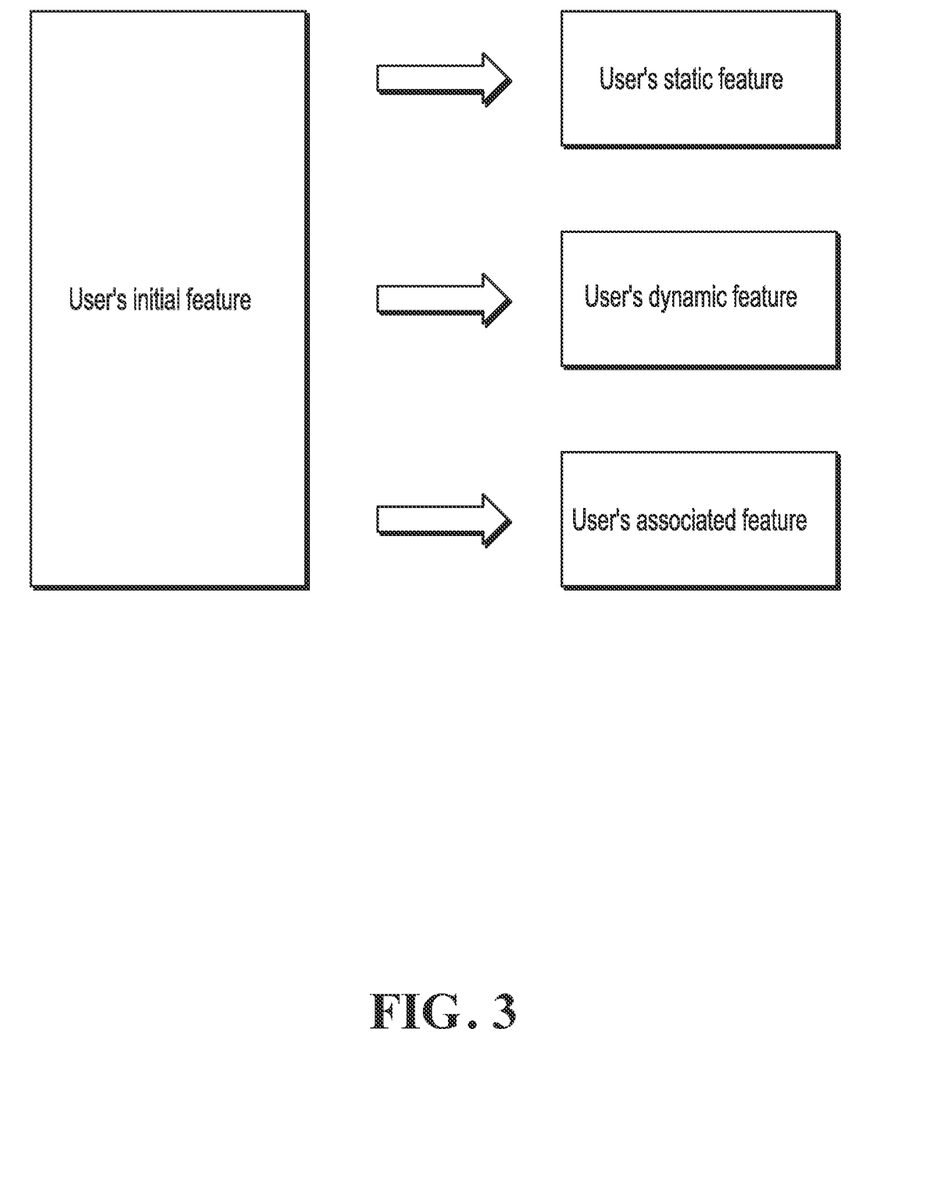
FIG. 3 is a schematic diagram illustrating user's initial feature segmentation in a method for training a deep forest network for object classification, according to an implementation of the present specification.

The user object is still used as an example. Referring to FIG. 3, FIG. 3 is a schematic diagram illustrating segmentation of the user's initial feature, according to an implementation of the present specification. The user's initial feature information can be classified into several groups of features, for example, a user's static feature (including user's basic information, such as gender, age, etc.), a user's dynamic feature (dynamic information, such as description information of recent N transactions), and a user's associated feature (namely, other user information related to the user, for example, information about other users who have traded with the user recently).

In subsequent processing, the several types of sub-features are separately extracted for training different layers (different levels) of the deep forest network, instead of uniformly processing the entire user's initial feature. The processing method for performing training based on feature segmentation by using various types of sub-features can reduce the dimensionality of each-layer training, reduce the training time, and help prevent the problem of model overfitting.

S203. Train each base classifier in a first level of decision tree forest set based on a first-type object sub-feature.

S204. Concatenate an output feature of a previous level of decision tree forest set and a next-type object sub-feature, and train each base classifier in a next level of decision tree forest set by using a concatenated feature.

S205. Determine whether a predetermined end condition is satisfied, and go back to perform step S204 repeatedly if the end condition is not satisfied, or perform step S206 if the end condition is satisfied.

There may be a plurality of end conditions. For example, determine that the end condition is satisfied when a prediction result is that an evaluation index is not increased or when the maximum number of network layers (the level number L) has been reached.

S206. Complete training when the predetermined end condition is satisfied, and obtain a deep forest network constituted of a plurality of levels of decision tree forest sets.

The deep forest network is a multi-layer (multi-level) network constructed with reference to an idea of integrated learning and by using a set (forest) based on a decision tree as a base classifier, where the number of network layers can be obtained adaptively. Nodes in each layer of network are a gradient enhancement decision tree.

Figure 4:
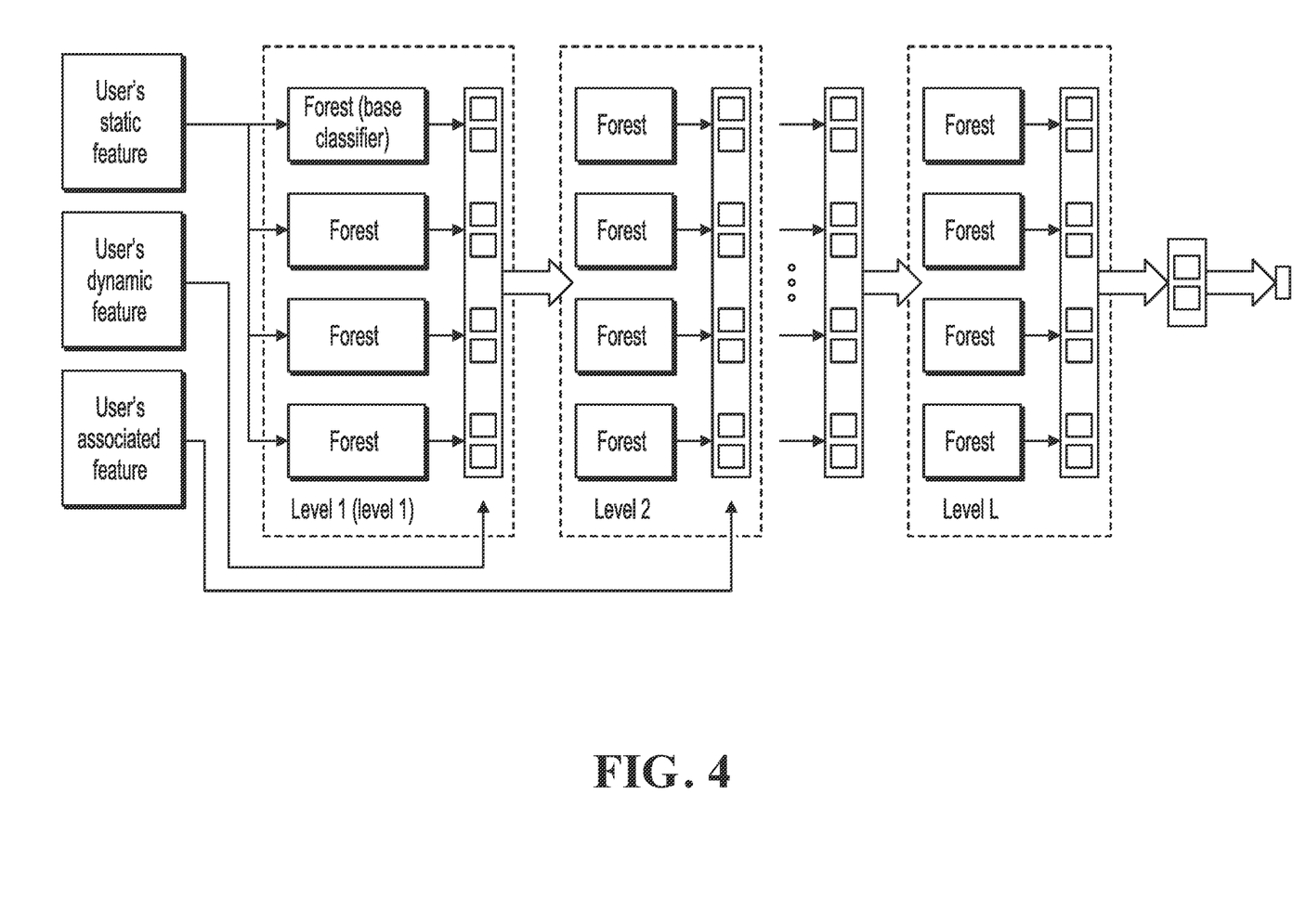
FIG. 4 is a schematic diagram illustrating a deep forest network in a method for training a deep forest network for object classification, according to an implementation of the present specification.

As shown in FIG. 4, FIG. 4 is a schematic diagram illustrating a deep forest network. The deep forest network includes L levels (L layers), and each level is a set of decision tree forests (a decision tree forest set), namely, an ensemble of ensembles. Each level of decision tree forest set includes a plurality of base classifiers (forests). Each level of decision tree forest set can include different types of forests (for example, a random forest or a completely random tree forest) to improve the network diversity. For example, each level of decision tree forest set in FIG. 4 includes four base classifiers. Each base classifier includes one or more decision trees.

In a network training process, in the levels of decision tree forest sets that are cascaded, input of each level of decision tree forest set except the last level of decision tree forest set is a concatenated feature obtained by concatenating feature information processed at a previous level and a corresponding user sub-feature (where the first level of decision tree forest set does not have a previous level, and therefore input is only a first-type user sub-feature). It can be learned that, because the user's initial feature is segmented into a plurality of types of user sub-features, training can be performed at each layer with reference to an operation of feature segmentation in the training process. This is very different from an initial deep forest network algorithm. Global features are uniformly processed in the initial algorithm, while different user sub-features are used at each layer in the present implementation of the present invention.

Assume that data has $d=d_1+d_2+d_3$ dimensions of features (a static feature $d_1$ dimension, a dynamic feature $d_2$ dimension, and an associated feature $d_3$ dimension). Assume that there are n groups of base classifiers (for example, four base classifiers shown in the figure), and the problem of abnormal-user identification is the binary classification problem (to detect whether a user is abnormal).

The training process can be divided into the following parts:

(1) Basic-layer training: It can be understood that the user's initial feature is segmented into a user's static feature, a user's dynamic feature, and a user's associated feature at layer 0 to construct a basic classification status of the user.

(2) Middle-layer training: Starting from layer 1 (level 1), each layer concatenates an output result of a previous layer and a user sub-feature that corresponds to the layer. It is worthwhile to note that there is a difference between user sub-features concatenated at each layer. For example, a user's static feature is concatenated at layer 1, a user's dynamic feature is concatenated at layer 2, a user's associated feature is concatenated at layer 3, the user's static feature is then concatenated at layer 4, . . . , and the features are sequentially circulated. As such, training is performed until the optimal number of layers is reached (until an evaluation index no longer increases).

(3) Last-layer training: At the last layer (layer L), input is only output of a previous layer (L−1) (and is not concatenated to a user sub-feature).

For example, in FIG. 4, input of level 1 is a first-type user sub-feature (for example, a user's static feature). If it is the binary classification problem, each base classifier at level 1 outputs a two-dimensional class vector, and each of four base classifiers generates one two-dimensional class vector to obtain an eight-dimensional class vector (4×2). Then, at level 2, the eight-dimensional class vector and a second-type user sub-feature (for example, a user's dynamic feature) are concatenated, and (n×c+d2) augmented features are received, where d2 is the number of input second-type user sub-features, n is the number of base classifiers, and c is the number of classes. Likewise, similar processing at level 2 is performed at level 3 to level (L−1). At the last level (level L), input is only output of a previous level (and is not concatenated to a user sub-feature), and the eight-dimensional class vector is output. Eventually, processing such as averaging is performed on the eight-dimensional class vector to output two-dimensional class vectors.

It can be learned that, in the example in FIG. 4, various types of user sub-features are sequentially circulated and input to each level of decision tree forest set. In other words, if there are three types of user sub-features A, B, and C and five levels of decision tree forest sets in total, input of each level of decision tree forest set can be represented as follows:

A->level-1
B+level-1-result->level-2
C+level-2-result->level-3
A+level-3-result->level-4
level-4-result->level-5

Here, level-1, level-2, level-3, level-4, and level-5 respectively represent each level of decision tree forest set; and level-1-result, level-2-result, and level-3-result respectively represent output of each level of decision tree forest set.

It is easy to learn from the above that:

(1) The various types of user sub-features are sequentially circulated and input to each level of decision tree forest set (except the last level of decision tree forest set), where the "sequentially" means a sequence of A, B, and C, and the circulation means that the user sub-features are input again in the sequence of A, B, and C after the last class feature (C) is input.

(2) Except the first level (whose input is only the user sub-feature) and the last level (whose input is only output of the previous level), input of each of middle levels of decision tree forest sets consists of two parts: a user sub-feature that is sequentially selected and output of a previous level.

It should be noted that in FIG. 4, a method for sequentially circulating and inputting the various types of user sub-features to each level of decision tree forest set is merely an example. In a practical operation, any one or more types of user sub-features can be randomly selected and then are input to a current level of decision tree forest set (except the last level).

Figure 5:
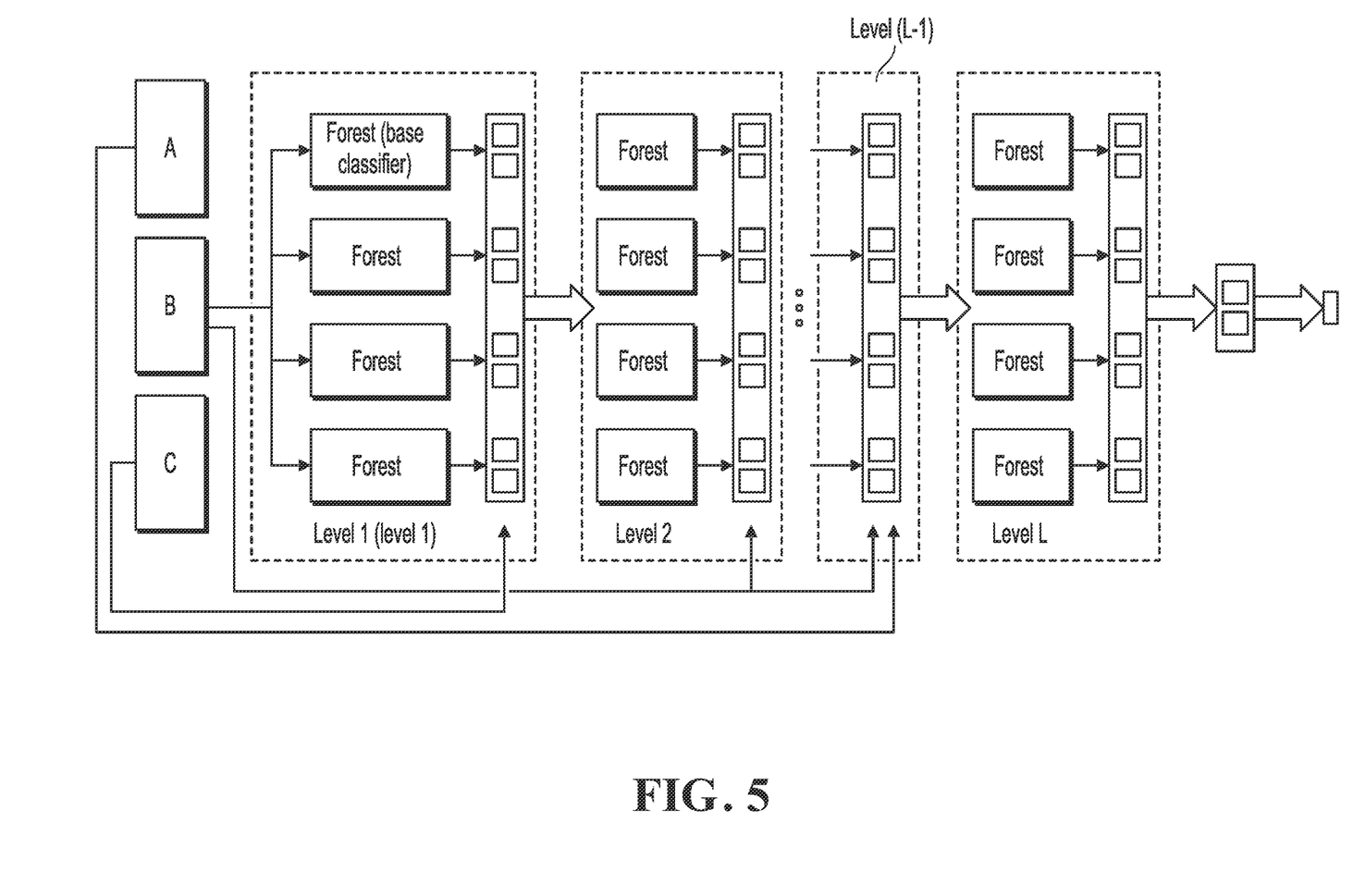
FIG. 5 is a schematic diagram illustrating a deep forest network in a method for training a deep forest network for object classification, according to an implementation of the present specification.

In another example shown in FIG. 5, if there are three types of user sub-features A, B, and C and L levels of decision tree forest sets in total, input of each level of decision tree forest set can be represented as follows:

B->level-1
C+level-1-result->level-2
. . .
A+C+level-(L−2)-result->level-(L−1)
level-(L−1)-result->level-L In the example in FIG. 5, one or more types of user sub-features are randomly selected and then are input to a current level of decision tree forest set (except the last level).

In an optional implementation, each base classifier in each level of decision tree forest set can be trained by using a k-fold cross-validation method, to alleviate the over-fitting problem.

Cross-validation is to divide raw data (dataset) into a training set and a validation set (validation set or test set). First, the training set is used to train a classifier, and then the validation set is used to test a model (model) obtained through training. As such, the validation set can be used as a performance index for evaluating the classifier.

A cross-validation method can be dividing the data of the black and white samples into a predetermined number of groups, and selecting any group as a validation set, and a dataset of a remaining group as a training set; and training each base classifier in each level of decision tree forest set by using each training set, and validating each base classifier in each level of decision tree forest set by using each corresponding validation set in a process of training each level of decision tree forest set.

For example, if a total 1000 black and white samples are selected and randomly divided into three groups: group 1, group 2, and group 3, there are three combination methods: Group 1 is a validation set, and datasets of groups 2 and 3 are used as training sets; group 2 is a validation set, and datasets of groups 1 and 3 are used as training sets; and group 3 is a validation set, and datasets of groups 1 and 2 are used as training sets. In the process of training the base classifier, the base classifier needs to be separately trained based on the three training sets.

Figure 6:
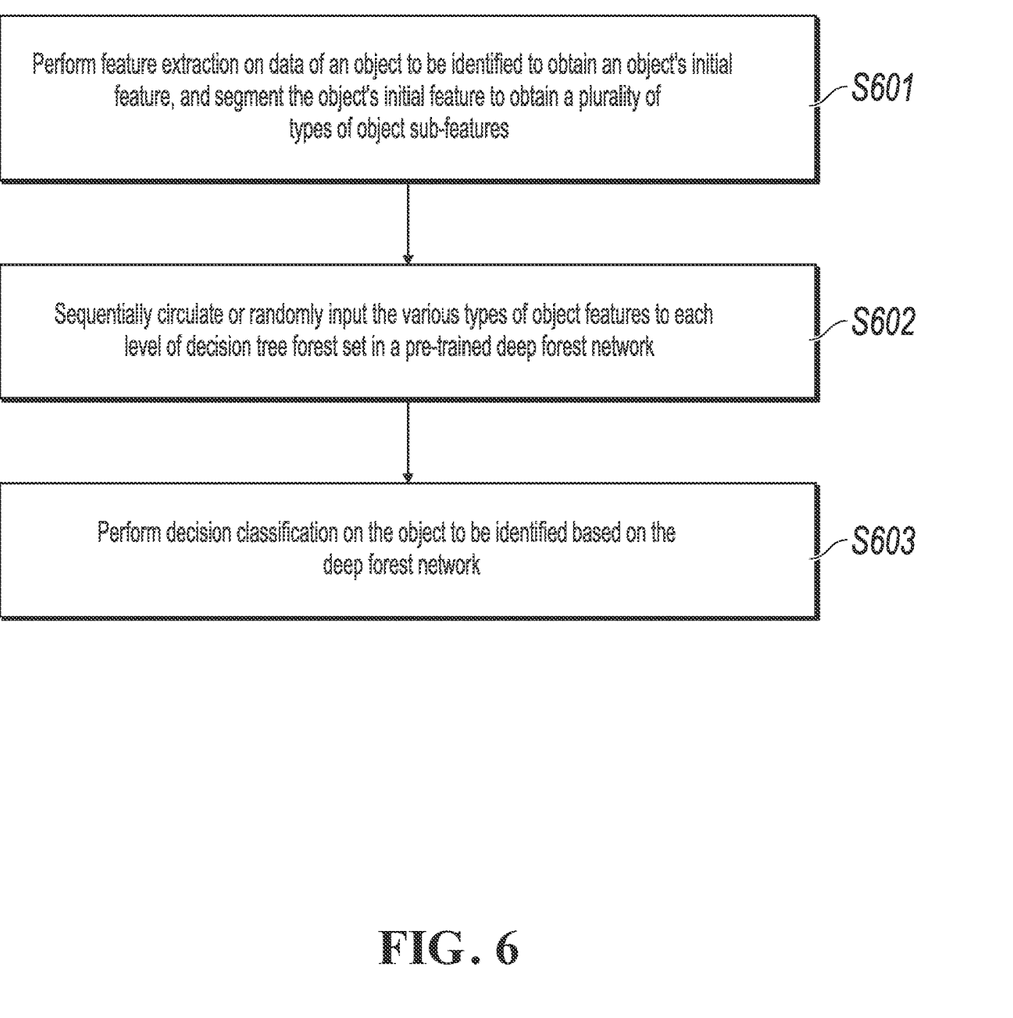
FIG. 6 is a flowchart illustrating an object classification method, according to an implementation of the present specification.

An implementation of the present specification provides an object classification method. Referring to FIG. 6, the method includes the following steps.

S601. Perform feature extraction on data of an object to be identified to obtain an object's initial feature, and segment the object's initial feature to obtain a plurality of types of object sub-features.

S602. Sequentially circulate or randomly input the various types of object sub-features to each level of decision tree forest set in a pre-trained deep forest network.

S603. Perform decision classification on the object to be identified based on the deep forest network.

For a process of feature segmentation and a process of training the deep forest network, references can be made to the previous content in the implementations of the present invention.

If the deep forest network has L layers (in other words, includes L levels of decision tree forest sets), in a process of predicting data of a user to be identified by using the deep forest network, the following process is performed:

(1) Predict transaction data to be identified by using n classifiers. For the transaction data to be identified, n×c prediction results are obtained, and are concatenated to a corresponding user sub-feature, namely, a (d−i)-dimensional feature, to obtain a new (d−i+n×c)-dimensional feature.

(2) For the n×c prediction results at the last layer L, n classification results are averaged to obtain c final prediction results, and the c prediction results are an eventual prediction probability of the deep forest network in c classes.

It can be learned that in the object classification method in the example of the user object, features of user data can be segmented, and for each type of user sub-feature obtained after the segmentation, decision classification can be performed by using a plurality of base classifiers in each level of decision tree forest set in a deep forest network, to eventually determine a probability that a user is abnormal. In addition, when samples of the abnormal user are likely to be sparse, a k-fold cross-validation method can be used to train a base classifier, thereby alleviating the over-fitting problem.

In addition to the user object, as described above, the present implementation of the present invention may classify a business object.

Businesses include transactions, online services, etc. A transaction is used as an example. In a risk control scenario, a transaction with a security risk usually needs to be found. Such transaction is referred to as an illegal transaction. Compared with normal transactions, such transactions are very few, and the number of such transactions is usually one to hundreds or even thousands. In addition, abnormal transactions have distinctive differences. Therefore, it is difficult to discover an illegal transaction. As such, in the object classification method for business identification provided in the present implementation of the present invention, more illegal transactions can be found based on the deep forest network by using the high efficiency feature of the deep forest network than by using algorithms in the existing technology.

When the object classification method provided in the present implementation of the present invention is used to identify a business, references can be made to the principles and steps in FIG. 2 to FIG. 5 provided that the user sub-feature is replaced with a business sub-feature, and therefore details are omitted here for simplicity.

Figure 7:
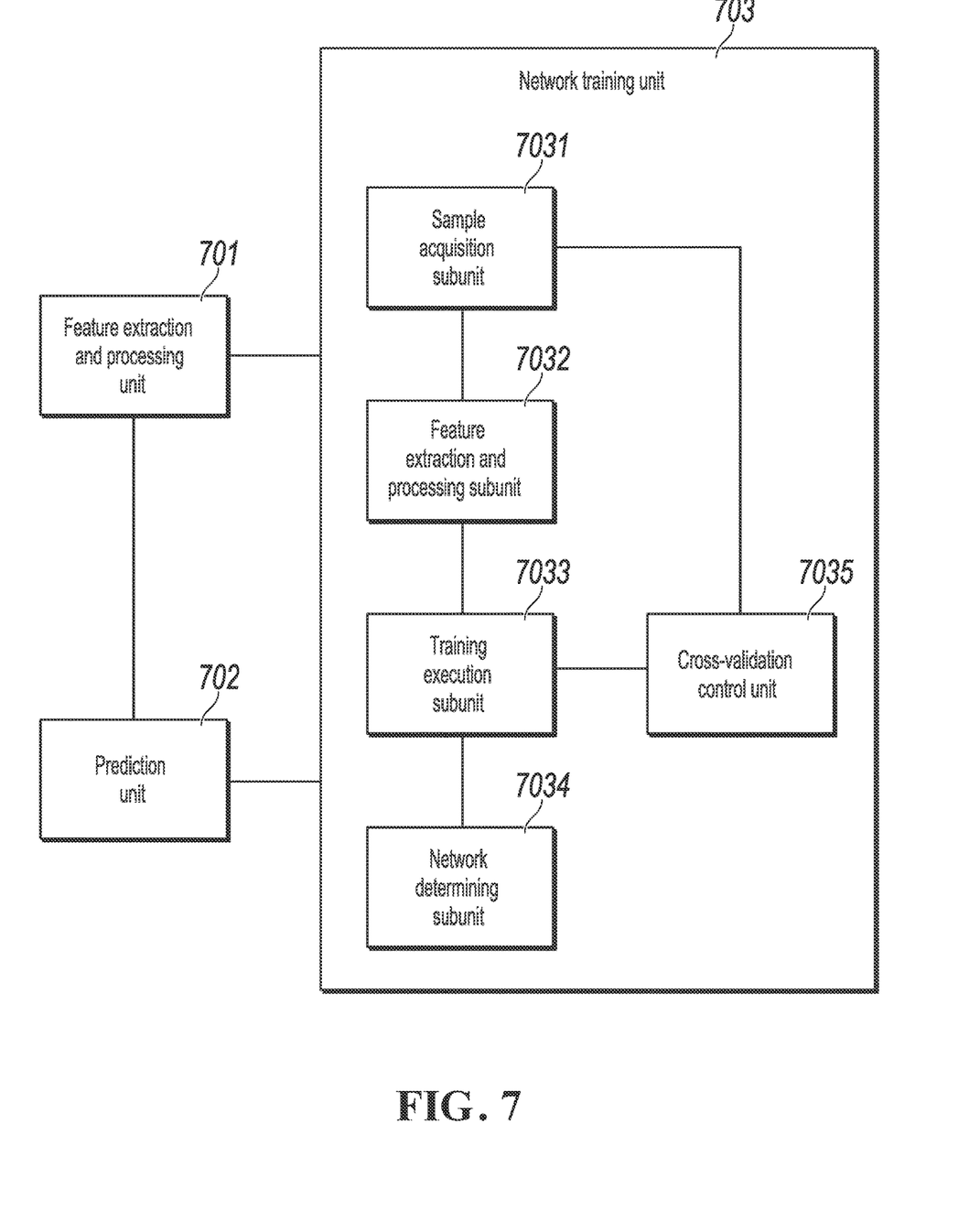
FIG. 7 is a schematic structural diagram illustrating an object classification apparatus, according to an implementation of the present specification.

Based on the same inventive concept, an implementation of the present specification provides an object classification apparatus. Referring to FIG. 7, the apparatus includes the following: a feature extraction and processing unit 701, configured to perform feature extraction on data of an object to be identified to obtain an object's initial feature, and segment the object's initial feature to obtain a plurality of types of object sub-features; and a prediction unit 702, configured to sequentially circulate or randomly input the various types of object sub-features to each level of decision tree forest set in a pre-trained deep forest network; and perform decision classification on the object to be identified based on the deep forest network.

In an optional implementation, the apparatus further includes a network training unit 703.

The network training unit 703 includes the following: a sample acquisition subunit 7031, configured to collect black and white samples related to an abnormal object; a feature extraction and processing subunit 7032, configured to perform feature extraction on data of the black and white samples to obtain the object's initial feature, and segment the object's initial feature to obtain the plurality of types of object sub-features; a training execution subunit 7033, configured to train each base classifier in a first level of decision tree forest set based on a first-type object sub-feature, concatenate an output feature of a previous level of decision tree forest set and a next-type object sub-feature, and train each base classifier in a next level of decision tree forest set by using a concatenated feature, where determine whether a predetermined end condition is satisfied after training on each level of decision tree forest set is completed, and a next level of decision tree forest set is trained if the predetermined end condition is not satisfied; or train each base classifier in a first level of decision tree forest set based on any one or several types of object sub-features, then concatenate an output feature of a previous level of decision tree forest set and any one or several types of object sub-features, and train each base classifier in a next level of decision tree forest set by using a concatenated feature, determine whether a predetermined end condition is satisfied after training on each level of decision tree forest set is completed, and a next level of decision tree forest set is trained if the predetermined end condition is not satisfied; and a network determining subunit 7034, configured to complete training when the predetermined end condition is satisfied, and obtain the deep forest network constituted of a plurality of levels of decision tree forest sets.

In an optional implementation, the feature extraction and processing unit 701 or the feature extraction and processing subunit 7032 is configured to group the object's initial feature based on a type of each feature in the object's initial feature; and obtain the various types of object sub-features through grouping.

In an optional implementation, the object sub-feature includes at least one of a user sub-feature and a business sub-feature, the user sub-feature includes two or more of a user's static feature, a user's dynamic feature, and a user's associated feature, and the business sub-feature includes a historical business feature and a real-time business feature.

In an optional implementation, the network training unit 703 further includes the following: a cross-validation control subunit 7035, configured to train each base classifier by using a cross-validation method.

In an optional implementation, the cross-validation control subunit 7035 is configured to divide the data of the black and white samples into a predetermined number of groups, and select any group as a validation set, and a dataset of a remaining group as a training set; and train each base classifier in each level of decision tree forest set by using each training set, and validate each base classifier in each level of decision tree forest set by using each corresponding validation set in a process of training each level of decision tree forest set.

Figure 8:
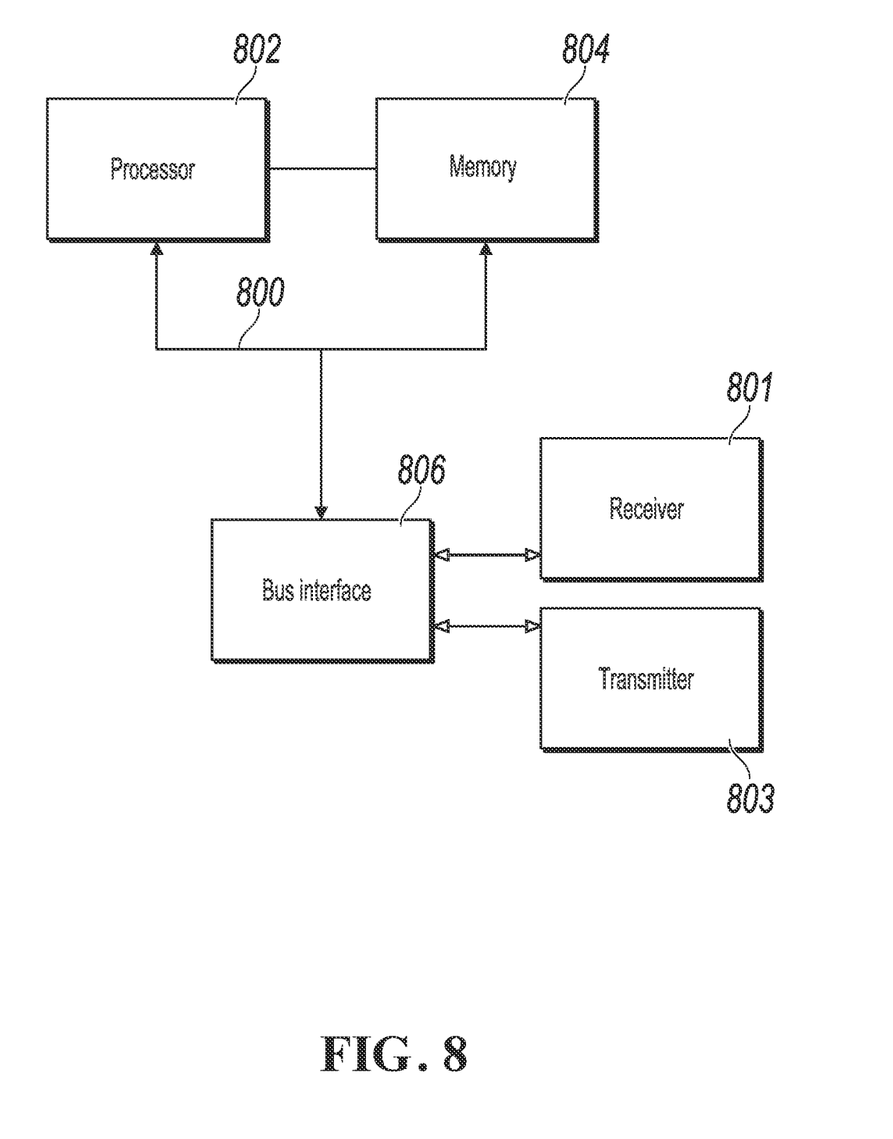
FIG. 8 is a schematic structural diagram illustrating a server, according to an implementation of the present application.

Based on the same inventive concept as the object classification method in the previous implementation, the present invention further provides a server. As shown in FIG. 8, the server includes a memory 804, a processor 802, and a computer program that is stored on the memory 804 and that can run on the processor 802. The processor 802 performs the steps of the object classification method when executing the program.

In FIG. 8, a bus architecture (represented by a bus 800), namely, the bus 800, can include any number of interconnected buses and bridges, and the bus 800 links various circuits including one or more processors represented by the processor 802 and a memory represented by the memory 804. The bus 800 may further link various other circuits such as a peripheral device, a voltage regulator, and a power management circuit, which are well known in the existing technology, and therefore are not further described in the present specification. A bus interface 806 provides an interface between the bus 800 and each of a receiver 801 and a transmitter 803. The receiver 801 and the transmitter 803 can be the same element, namely, a transceiver, and provide units configured to communicate with various other apparatuses on a transmission medium. The processor 802 is responsible for managing the bus 800 and usual processing, and the memory 804 can be configured to store data used when the processor 802 performs an operation.

Based on the inventive concept of the object classification method in the previous implementation, the present invention further provides a computer readable storage medium, a computer program is stored on the computer readable storage medium, and a processor performs the steps of the object classification method when the program is executed by the processor.

The present specification is described with reference to the flowcharts and/or block diagrams of the method, the device (system), and the computer program product according to the implementations of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a special-purpose computer, a built-in processor, or a processor of another programmable data processing device to generate a machine, so that the instructions executed by the computer or the processor of the another programmable data processing device generate a device for implementing a specified function in one or more flows in the flowcharts and/or in one or more blocks in the block diagrams.

These computer program instructions can be stored in a computer readable memory that can instruct the computer or the another programmable data processing device to work in a certain way, so that the instructions stored in the computer readable memory generate an artifact that includes an instruction device. The instruction device implements a specified function in one or more processes in the flowcharts and/or in one or more blocks in the block diagrams.

These computer program instructions can be loaded onto the computer or the another programmable data processing device, so that a series of operations and steps can be performed on the computer or the another programmable device, thereby generating computer-implemented processing. Therefore, the instructions executed on the computer or the another programmable device provide steps for implementing a specified function in one or more flows in the flowcharts and/or in one or more blocks in the block diagrams.

Although some preferred implementations of the present specification have been described, a person skilled in the art can make changes and modifications to these implementations once they learn the basic inventive concept. Therefore, the following claims are intended to be construed as to cover the preferred implementations and all changes and modifications falling within the protection scope of the present specification.

Apparently, a person skilled in the art can make various modifications and variations towards the present specification without departing from the spirit and scope of the present specification. The present specification is intended to cover these modifications and variations of the present specification provided that they fall within the protection scope defined by the following claims and their equivalent technologies of the present specification.

Figure 9:
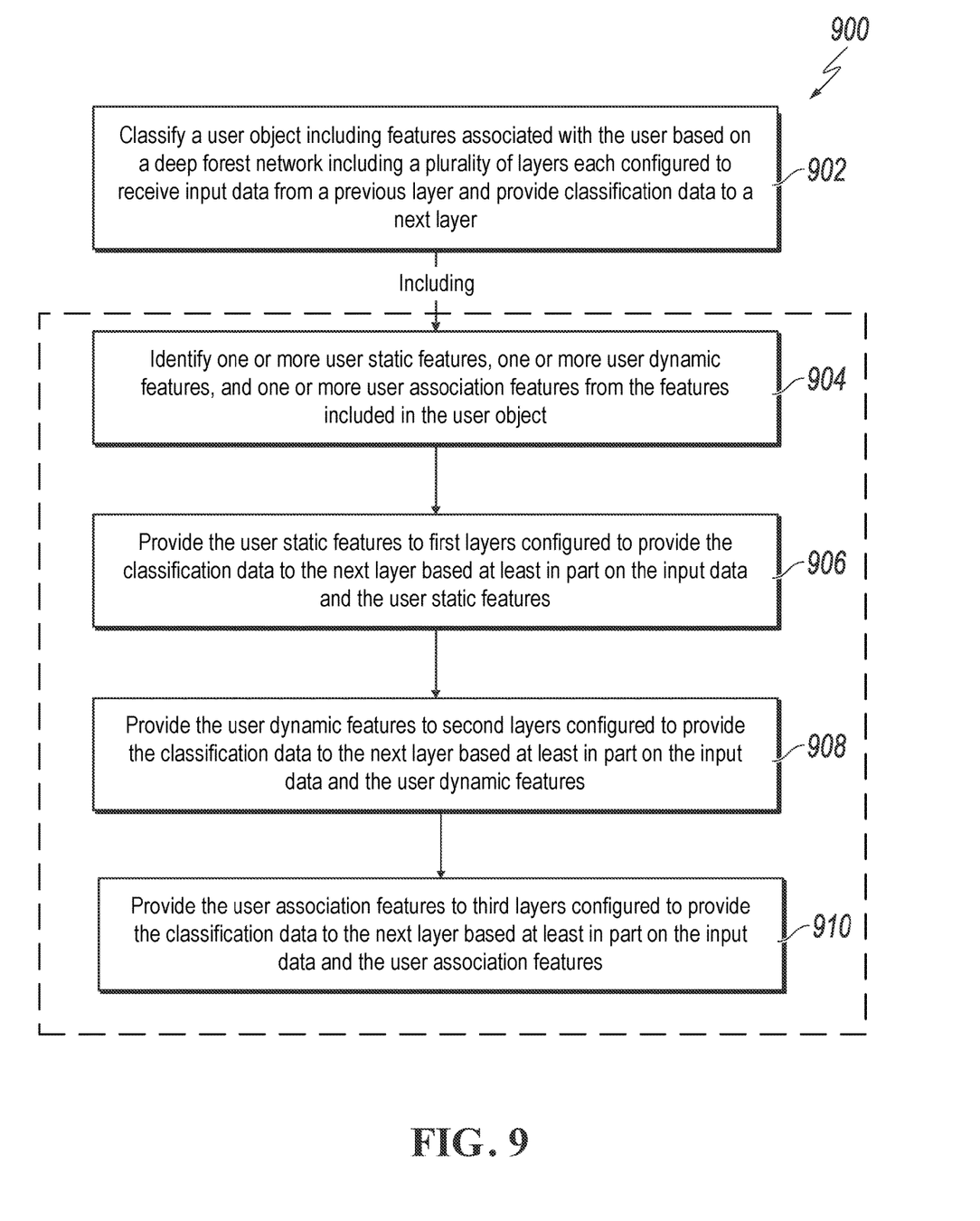
FIG. 9 is a flowchart illustrating an example of a computer-implemented method for object classification, according to an implementation of the present disclosure.

FIG. 9 is a flowchart illustrating an example of a computer-implemented method 900 for object classification, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a user object is classified based on a deep forest network, the user object representing a user and including features associated with the user, the deep forest network including a plurality of layers each configured to receive input data from a previous layer and provide classification data to a next layer. In some cases, classifying the user object based on the deep forest network includes classifying the user represented by the user object as normal or abnormal.

As shown, classifying the user object at 902 includes the actions 904 through 910. In some implementations, action 904 through 910 can be performed as part of other actions besides classifying a user object, for example as part of training the deep forest network based on a user object from a training set of user objects.

At 904, one or more user static features, one or more user dynamic features, and one or more user association features are identified from the features included in the user object. In some cases, the user static features include at least one of gender, race, or nationality. In some implementations, the user dynamic features include a set of transactions performed by the user represented by the user object. In some cases, the user association features include a set of other users associated with the user represented by the user object.

At 906, the user static features are provided to first layers from the plurality of layers, each first layer configured to provide the classification data to the next layer based at least in part on the input data and the user static features.

At 908, the user dynamic features are provided to second layers from the plurality of layers different than the first layers, each second layer configured to provide the classification data to the next layer based at least in part on the input data and the user dynamic features.

At 910, the user association features are provided to third layers from the plurality of layers different than the first and second layers, each third layer configured to provide the classification data to the next layer based at least in part on the input data and the user association features.

In some cases, classifying the user object based on the deep forest network includes providing the user static features to one or more base classifiers, each base classifier configured to provide an initial classification of the user object as input to an initial layer from the plurality of layers. In some implementations, classifying the user object based on the deep forest network includes providing the user static features to one or more base classifiers, each base classifier configured to provide an initial classification of the user object as input to an initial layer from the plurality of layers.

In some cases, each of the plurality of layers produces classification results associated with a plurality of categories, and classifying the user object based on the deep forest network includes: receiving final classification results from a last layer from the plurality of layers, each classification result associated with one of the plurality of categories; and averaging the final classification results to obtain final prediction results, the final prediction results representing probabilities that the user object is associated with the associated category.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for detecting anomalous user behaviors, the computer-implemented method comprising:
    classifying a user object based on a deep forest network, the user object representing a user and including information associated with the user, the deep forest network including a plurality of layers each configured to receive input data from a previous layer and provide classification data to a next layer, wherein classifying the user object includes:
        partitioning features into a plurality of feature groups comprising a user static feature group, a user dynamic feature group, and a user association feature group, wherein the features are extracted from the information associated with the user;
        repeatedly providing the user static features to a first layer in every three layers, each first layer configured to provide the classification data to the next layer based at least in part on the input data and the user static features;
        repeatedly providing the user dynamic features to a second layer in every three layers, each second layer configured to provide the classification data to the next layer based at least in part on the input data and the user dynamic features;
        repeatedly providing the user association features to a third layer in every three layers, each third layer configured to provide the classification data to the next layer based at least in part on the input data and the user association features; and
    obtaining final prediction results, the final prediction results including probability scores for each of a plurality of categories, each probability score representing a predicted likelihood that the user object belongs to the category.

2. The computer-implemented method of claim 1, wherein classifying the user object based on the deep forest network includes:
    providing features belonging to the user static feature group to one or more base classifiers, each base classifier configured to provide an initial classification of the user object as input to an initial layer from the plurality of layers.

3. The computer-implemented method of claim 1, wherein obtaining final prediction results comprises:
    averaging final classification results that are generated by a last layer of the plurality of layers.

4. The computer-implemented method of claim 1, wherein the user static feature group includes at least one feature representing gender, race, or nationality.

5. The computer-implemented method of claim 1, wherein the user dynamic feature group includes features representing a set of transactions performed by the user represented by the user object.

6. The computer-implemented method of claim 1, wherein the user association feature group includes features representing a set of other users associated with the user represented by the user object.

7. The computer-implemented method of claim 1, wherein classifying the user object based on the deep forest network includes classifying the user represented by the user object as normal or abnormal.

8. A non-transitory, computer-readable medium storing one or more instructions executable by a computer system to perform operations comprising:
    classifying a user object based on a deep forest network, the user object representing a user and including information associated with the user, the deep forest network including a plurality of layers each configured to receive input data from a previous layer and provide classification data to a next layer, wherein classifying the user object includes:
  partitioning features into a plurality of feature groups comprising a user static feature group, a user dynamic feature group, and a user association feature group, wherein the features are extracted from the information associated with the user;
  repeatedly providing the user static features to a first layer in every three layers, each first layer configured to provide the classification data to the next layer based at least in part on the input data and the user static features;
  repeatedly providing the user dynamic features to a second layer in every three layers, each second layer configured to provide the classification data to the next layer based at least in part on the input data and the user dynamic features;
  repeatedly providing the user association features to a third layer in every three layers, each third layer configured to provide the classification data to the next layer based at least in part on the input data and the user association features; and
  obtaining final prediction results, the final prediction results including probability scores for each of a plurality of categories, each probability score representing a predicted likelihood that the user object belongs to the category.

9. The non-transitory, computer-readable medium of claim 8, wherein classifying the user object based on the deep forest network includes:
  providing features belonging to the user static feature group to one or more base classifiers, each base classifier configured to provide an initial classification of the user object as input to an initial layer from the plurality of layers.

10. The non-transitory, computer-readable medium of claim 8, wherein obtaining final prediction results comprises:
  averaging final classification results that are generated by a last layer of the plurality of layers.

11. The non-transitory, computer-readable medium of claim 8, wherein the user static feature group includes at least one feature representing gender, race, or nationality.

12. The non-transitory, computer-readable medium of claim 8, wherein the user dynamic feature group includes features representing a set of transactions performed by the user represented by the user object.

13. The non-transitory, computer-readable medium of claim 8, wherein the user association feature group includes features representing a set of other users associated with the user represented by the user object.

14. The non-transitory, computer-readable medium of claim 8, wherein classifying the user object based on the deep forest network includes classifying the user represented by the user object as normal or abnormal.

15. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    classifying a user object based on a deep forest network, the user object representing a user and including information associated with the user, the deep forest network including a plurality of layers each configured to receive input data from a previous layer and provide classification data to a next layer, wherein classifying the user object includes:
      partitioning features into a plurality of feature groups comprising a user static feature group, a user dynamic feature group, and a user association feature group, wherein the features are extracted from the information associated with the user;
      repeatedly providing the user static features to a first layer in every three layers, each first layer configured to provide the classification data to the next layer based at least in part on the input data and the user static features;
      repeatedly providing the user dynamic features to a second layer in every three layers, each second layer configured to provide the classification data to the next layer based at least in part on the input data and the user dynamic features;
      repeatedly providing the user association features to a third layer in every three layers, each third layer configured to provide the classification data to the next layer based at least in part on the input data and the user association features; and
      obtaining final prediction results, the final prediction results including probability scores for each of a plurality of categories, each probability score representing a predicted likelihood that the user object belongs to the category.

16. The system of claim 15, wherein classifying the user object based on the deep forest network includes:
  providing features belonging to the user static feature group to one or more base classifiers, each base classifier configured to provide an initial classification of the user object as input to an initial layer from the plurality of layers.

17. The system of claim 15, wherein obtaining final prediction results comprises:
  averaging final classification results that are generated by a last layer of the plurality of layers.

18. The system of claim 15, wherein the user static feature group includes at least one feature representing gender, race, or nationality.

19. The system of claim 15, wherein the user dynamic feature group includes features representing a set of transactions performed by the user represented by the user object.

20. The system of claim 15, wherein the user association feature group includes features representing a set of other users associated with the user represented by the user object.

* * * * *